UNITED STATES PATENT OFFICE.

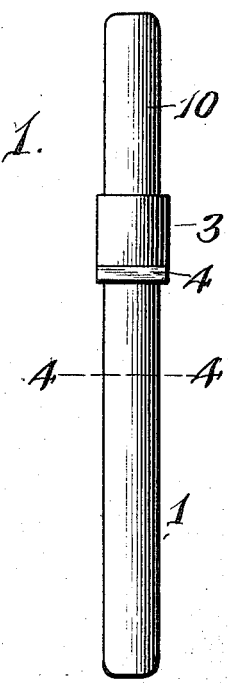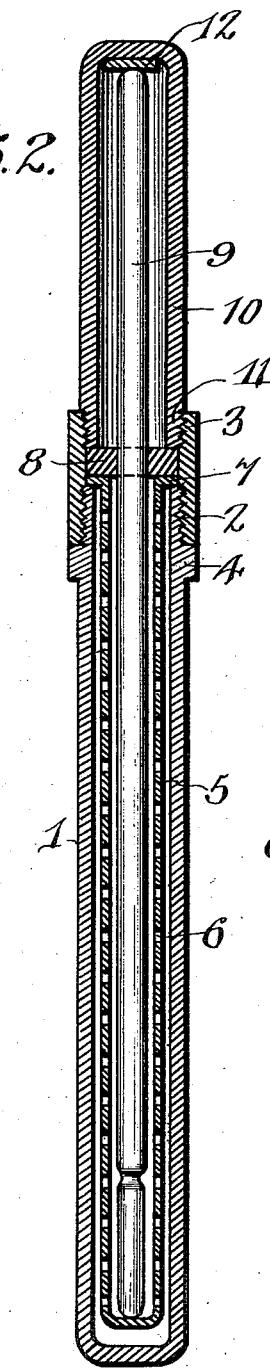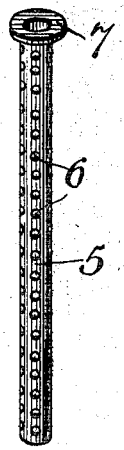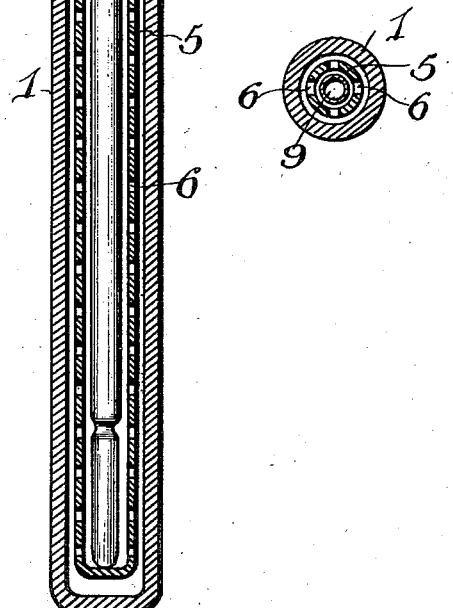

WILLIAM R. ARCHIBALD, OF SELMA, ALABAMA.

THERMOMETER-CASE.

1,037,102.  Specification of Letters Patent.  Patented Aug. 27, 1912.

Application filed December 14, 1911. Serial No. 665,678.

*To all whom it may concern:*

Be it known that I, WILLIAM R. ARCHIBALD, a citizen of the United States, residing at Selma, in the county of Dallas and State of Alabama, have invented certain new and useful Improvements in Thermometer-Cases, of which the following is a specification, reference being had therein to the accompanying drawing.

This invention relates to clinical thermometer holders and has especially for its object the production of an efficient holder which may contain disinfectant material into which the thermometer may be inserted so that each time the thermometer is withdrawn from its case the thermometer will be in condition for use, thereby avoiding the necessity of repeated washing.

Another object of this invention is the production of an efficient perforated shield case carried within the thermometer case which forms a supporting pocket for the thermometer independently of the outer case, thereby allowing the disinfectant material to act upon the entire surface of the thermometer within the lower section of the case.

With these and other objects in view the invention consists in general of certain novel constructions, combinations and arrangements of parts, as will be hereinafter fully described, illustrated in the accompanying drawings, and specifically claimed.

In the drawing: Figure 1 is a side elevation of the thermometer case. Fig. 2 is an enlarged vertical section therethrough. Fig. 3 is a detail perspective of the perforated thermometer shield. Fig. 4 is a section taken on the line 4—4, Fig. 1.

When the thermometer is not in use the same is placed within the thermometer casing which casing may be carried conveniently in the pocket of the owner. The casing above referred to comprises a body 1 having a reduced threaded end 2 which is engaged by means of an internally threaded collar 3. The shoulder 4 is formed upon the body 1 for limiting the movement of the collar 3 upon the body 1 in one direction. The body 1 consists of a hollow tubular portion within which is suspended the perforated shield casing 5 illustrated more clearly in detail in Fig. 3. This casing 5 is spaced from the side wall of the body 1 so as to allow the disinfectant which is adapted to be carried within the body 1 to readily act upon and encircle the perforated shield casing as well as the thermometer carried thereby. The shield casing 5 is provided, as above inferred, with a plurality of apertures 6 through which apertures passes the disinfectant contained within the body 1. The shield casing 5 is provided on its upper end with a flared collar portion 7, which collar portion rests upon the upper edge of the threaded end 2 of the body 1, thereby spacing the lower end of the shield casing from the lower end of the body 1, as clearly illustrated in the enlarged section shown in Fig. 2. If it is so desired a washer 8 may be placed upon the collar 7 of the shield casing 5 as illustrated in Fig. 2 for forming an air tight closure at the upper end of the body 1 and for also holding the thermometer 9 in its correct position and out of engagement with the shield casing 5 whereby the disinfectant may readily act upon any surface of the thermometer 9 which is placed within the said shield casing.

A cap 10 has its lower externally threaded end 11 threaded into the upper end of the collar 3 for firmly holding the thermometer 9 within the body 1. A pad 12 may also be carried by the upper end of the top cap 10 for preventing injury to the upper end of the thermometer 9 in case the same should be suddenly jarred.

From the foregoing it will be obvious that a very efficient thermometer case has been produced which will allow the thermometer to be conveniently carried without danger of having the same injured and it will also be evident that owing to the shield casing 5 the thermometer will be so supported as to have the disinfectant which is carried within the body 1 act upon the entire surface of the thermometer.

What is claimed is:

1. A clinical thermometer holder comprising a body portion having an upper reduced threaded end, a collar threaded upon said reduced threaded end, a thermometer shield casing suspended within said body, a detachable cap engaging said collar for closing the upper end of said body, and sealing means interposed between the lower end of said cap and the upper end of said body for forming an air tight closure when a thermometer is placed within said body, and also being adapted to hold the thermometer in spaced relation from said protector casing.

2. A holder for clinical thermometers comprising a body, a collar positioned thereon, a perforated shield casing depending into said body and being provided with a collar at its upper end for supporting said shield casing within said body in spaced relation from the side walls of said body and also supporting said shield casing in spaced relation from the bottom of said body, a detachable cap engaging said collar, and said shield casing being adapted to receive the thermometer for holding the same in such position as to allow the disinfectant contained within said body to act upon the entire surface of the thermometer carried within said body.

In testimony whereof I hereunto affix my signature in presence of two witnesses.

WILLIAM R. ARCHIBALD.

Witnesses:
W. P. COOK,
JOE TILLMAN.